United States Patent
Frei

[15] 3,685,839
[45] Aug. 22, 1972

[54] HYDROSTATIC SHAFT SEAL

[72] Inventor: Arno Frei, Winterthur, Switzerland

[73] Assignee: Sulzer Brothers, Ltd., Winterthur, Switzerland

[22] Filed: June 22, 1970

[21] Appl. No.: 48,141

[30] Foreign Application Priority Data

June 25, 1969 Switzerland..............9702/69

[52] U.S. Cl..........................277/27, 277/73, 277/91
[51] Int. Cl............................F16j 15/16, F16j 15/40
[58] Field of Search.............277/81, 73, 27, 3, 28, 91

[56] References Cited

UNITED STATES PATENTS

| | | |
|---|---|---|
| 3,024,027 | 3/1962 | Kubiak.......................277/27 |
| 1,903,210 | 3/1933 | Carrier........................277/73 |
| 2,999,702 | 9/1961 | Dunn et al. ............ ..277/83 X |
| 3,035,841 | 5/1962 | Riester......................277/83 X |
| 3,085,808 | 4/1963 | Williams...................277/73 X |
| 3,273,899 | 9/1966 | Warnery...................277/73 X |
| 3,580,587 | 5/1971 | Born et al......................277/3 |

*Primary Examiner*—Samuel B. Rothberg
*Attorney*—Kenyon & Kenyon Reilly Carr & Chapin

[57] ABSTRACT

The seal includes a non-rotatable axially movable sealing member which is biased to move toward a collar fixed to the rotating shaft. The sealing member is moved away from the collar at start-up, by a spring loaded plunger. The plunger is biased by springs which are effective so long as a predetermined differential pressure exists across the plunger.

11 Claims, 4 Drawing Figures

PATENTED AUG 22 1972 3,685,839

Inventor:
ARNO FREI

BY
Kenyon & Kenyon Reilly Carr & Chapin
ATTORNEYS

HYDROSTATIC SHAFT SEAL

Hydrostatic seals have been known in which a non-rotatable sealing member has been adapted to move axially relative to a rotating counterpart member in order to define a very narrow gap therebetween during operation. However, the pressure of the system utilizing such a seal must reach a critical value before the sealing member can disengage from the other member and operate satisfactorily. Unfortunately, these two members can not disengage from one another at low system pressures, e.g. at starting, since these low pressures are insufficient to create the forces necessary for disengagement. As a result, the members have remained in contact with one another and have worn rapidly so that seal life is reduced.

Accordingly, it is an object of the invention to increase the life of a hydrostatic seal.

It is another object of the invention to reduce wear on a non-rotatable sealing member of a hydrostatic seal.

It is another object of the invention to separate a non-rotatable sealing member from a rotatable counterpart member of a hydrostatic seal at low operating pressure.

Briefly, the invention provides a hydrostatic shaft seal for a pressure system which has a non-rotatable axially movable sealing member and a rotatable member with a separating means for maintaining the members in spaced relation while the system pressure is below a predetermined critical value. The separating means is constructed so as to be responsive to a differential force created by a force arising from the system pressure and an oppositely directed force. When the force created by the system pressure is less than a predetermined critical value, such as when the system is starting-up, the separating means moves the sealing member away from the rotatable member. When the system pressure force is more than the critical value, the separating means is deactivated to allow the sealing member to be moved back towards the rotatable member, for example, under a spring biasing force.

These and other objects and advantages of the invention will become more apparent from the following detailed description and appended claims taken in conjunction with the accompanying drawings in which:

Figure 1A:
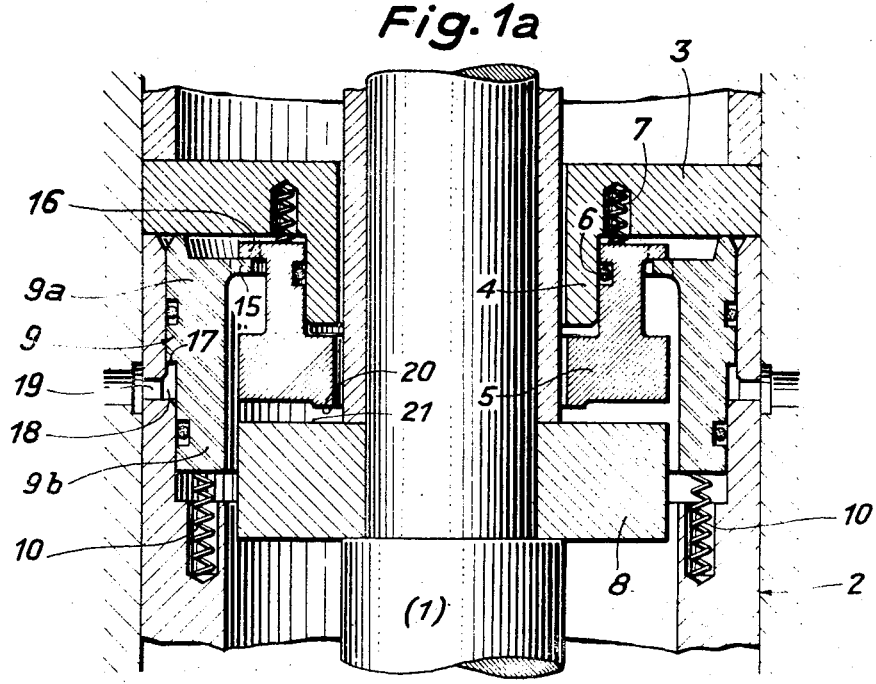
FIG. 1a illustrates a cross-sectional view of a seal according to the invention during the start up period of a pump incorporating the seal.

Referring to FIG. 1a, a pump has a rotor shaft 1 therein extending through a sealing part 2 which is closed at one end by a cover 3. The cover 3 has a depending cylindrical extension 4 which guides a stem portion of a non-rotating sealing member 5 therein. In order to maintain a seal-tight relation between the extension 4 and the sealing member 5, a suitable ring gasket 6 is disposed within a groove of the stem portion between the extension 4 and sealing member 5. The shaft 1 is also provided with a counterpart member 8 in the form of a collar which is secured thereon below and in spaced relation to the sealing member 5.

A plurality of springs 7 are disposed in suitable sockets of the cover 3 and abut the sealing member 5 in order to bias the member 5 axially towards the counterpart 8.

A separating means is disposed within the sealing part 2 to move the sealing member 5 away from the counterpart member 8. This separating means includes a piston means in the form of an annular plunger 9 which is disposed on the inner periphery of the sealing part 2 so as to move axially and concentrically of the rotor shaft 1 and a plurality of springs 10 which bias the plunger 9 towards the cover 3. The plunger 9 includes a radial extension 15 which extends inwardly and is located under an outwardly extending radial extension 16 on the sealing member 5. The plunger 9 is also of stepped configuration with two piston-like parts 9a, 9b of different diameters defining an annular step 17 therebetween. The sealing part 2 is similarly contoured so that an annular space or gap 18 is formed between the sealing part 2 and plunger 9. This space 18 communicates via a discharge orifice in the sealing part 2 with a space (not shown) at a pressure lower than the system pressure of the pump, e.g. the atmosphere. Because of the stepped configuration, the force which the system pressure exerts on the upper plunger part 9a is greater than the opposed force acting on the lower plunger part 9b. As a result, the resultant differential force opposes the force of the springs 10.

The springs 10 are of a size and construction such that during starting, i.e. while the system pressure in the pump is below a critical value of e.g. 10 atmospheres gauge, the force of the springs 10 is greater than the opposed differential force produced by the system pressure acting of the step 17. It is noted that the force of the springs 7 is relatively small and is considered to be negligible. As a result, the plunger 9 is moved toward the cover 3 while the radial extension 15 abuts the extension 16 of the sealing member 5 and causes the sealing member 5 to disengage from the counterpart member 8. Therefore, during starting, no wear of the sealing surface 20 of the sealing member 5 or of the opposed sealing surface 21 of the counterpart member 8 can occur.

Figure 1B:
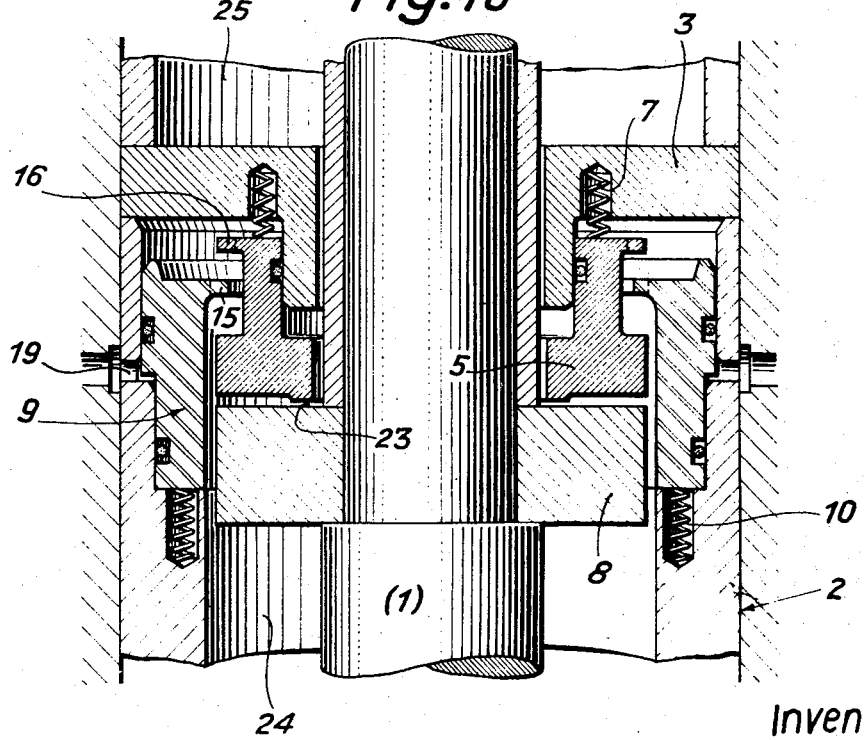
FIG. 1b illustrates a view similar to FIG. 1a during operation at full working pressure.

Referring to FIG. 1b, once the system pressure exceeds the critical value, the differential force acting on the step 17 exceeds the force of the springs 10 so that the plunger 9 is urged toward the counterpart member 8 and in so doing releases the sealing member 5. Thereafter, the springs 7 move the sealing member 5 towards the counterpart member 8 until only a narrow gap 23 remains between the sealing surfaces 20, 21. A contact-less seal then exists between the pump interior 24 and upper chamber 25.

Figure 2A:
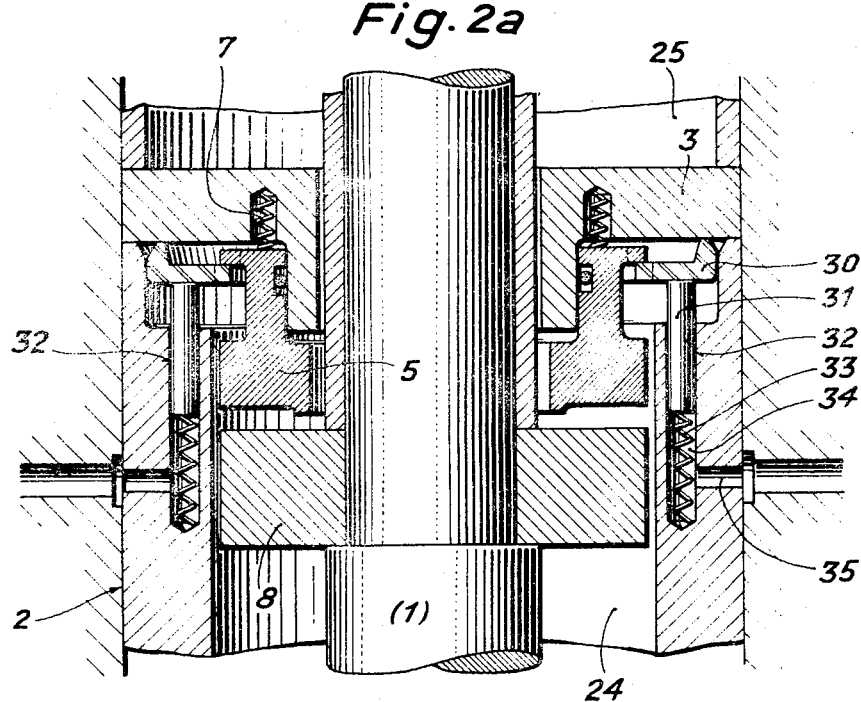
FIG. 2a illustrates a cross-sectional view of a modified shaft seal according to the invention.

Referring to FIG. 2a, instead of using a single plunger, a number of component plungers can be distributed over the periphery of the seal. To this end, the separating means includes a ring 30 carried by a plurality of plungers 31 each of which is guided in a passage 32 in the sealing part 2 and biased by a spring 33 towards the cover 3. The bottom of each passage 32 communicates via an orifice 35 with a space (not shown) e.g. atmosphere, at a lower pressure than the system pressure.

Figure 2B:
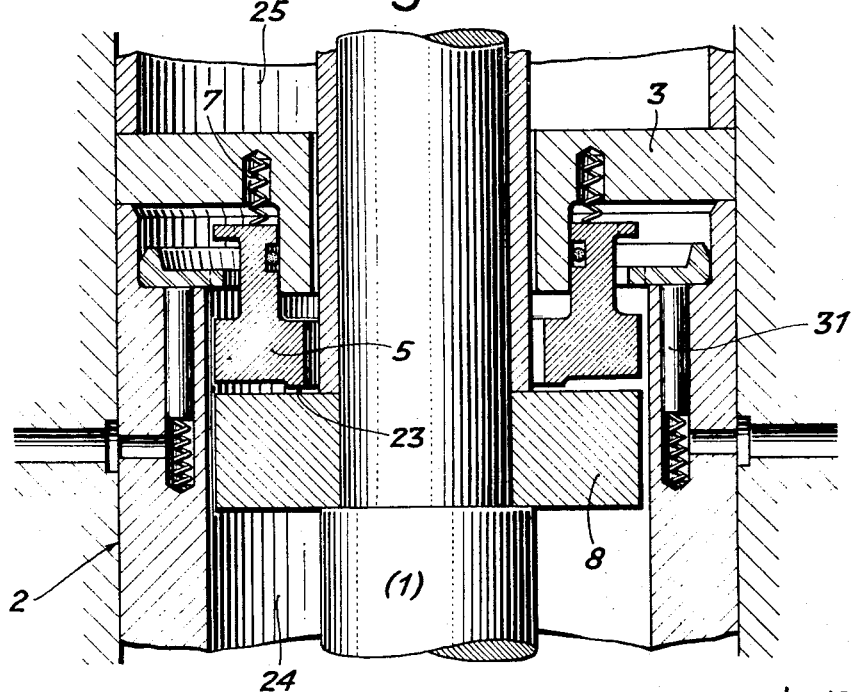
FIG. 2b illustrates a view of the seal of FIG. 2a during operation at full working pressure.

In operation, each plunger 31 experiences a force arising from the system pressure and the force of a spring 33. As above, the springs 33 are sized and constructed such that at start-up, i.e. while the pump system pressure is below a critical value, the force of the springs 33 is greater than the differential pressure force acting on the plungers 31. Thus, the ring 30 is urged toward the cover 3 and during movement abuts the radial extension of the sealing member 5 to disengage the sealing member 5 from the counterpart member 8. Once the system pressure reaches the critical value (FIG. 2b), the differential force on the plungers 31 overcomes the force of the springs 33 so that the plungers 31 and ring 30 are urged toward the counterpart 8 and release the sealing member 5. The springs 7 then move the sealing member 5 towards the counterpart member 8, as above, to form a contact-less seal 23.

The invention thus provides a hydrostatic seal in which the two sealing members are prevented from contacting each other at low system pressures. Wear of these member is thus minimized while seal life is prolonged.

What is claimed is:

1. A hydrostatic shaft seal for a pressure system comprising
   a shaft;
   a rotatable member on said shaft;
   a non-rotatable sealing member mounted for axial movement relative to said rotatable member between a non-sealing position and a sealing position with respect to said rotatable member;
   first means biasing said non-rotatable sealing member into said sealing position; and
   piston means surrounding said shaft exposed to a first force arising from the system pressure and to an opposed second force biasing said sealing means away from said sealing position and to a pressure lower than the system pressure, said piston means biasing said sealing member by direct contact therewith into said non-sealing position when the system pressure is below a predetermined critical value and releasing said sealing member for movement under the influence of said first means into said sealing position when said critical value of the system pressure is exceeded.

2. A hydrostatic shaft seal for a pressure system comprising
   a rotatable member;
   a non-rotatable sealing member mounted in spaced axial relation to said rotatable member for movement axially relative to said rotatable member into hydrostatic sealing relation with said rotatable member; and
   piston means surrounding said shaft biasing said sealing member and said rotatable member into spaced relation under a first force while the system pressure is below a predetermined critical value, said piston means being exposed to a second force arising from the system pressure and being oppositely directed to said first force whereby said sealing member is allowed to move toward said rotatable member in response to said second force exceeding said first force, said piston means including a stepped plunger coaxially movable of said sealing member, said plunger having said second force applied to one side thereof and a lower pressure applied to the opposite side thereof.

3. A hydrostatic shaft seal as set forth in claim 2 wherein said plunger is an annular piston.

4. A hydrostatic shaft seal as set forth in claim 2 wherein said lower pressure is atmospheric pressure.

5. A hydrostatic shaft seal for a pressure system comprising
   a rotatable member;
   a non-rotatable sealing member mounted in spaced axial relation to said rotatable member for movement axially relative to said rotatable member into hydrostatic sealing relation with said rotatable member; and
   separating means biasing said sealing member and said rotatable member into spaced relation, said separating means including an axially movable plunger for contacting said sealing member and at least one spring biasing said plunger towards said sealing member whereby when the system pressure is below a critical value said spring moves said plunger against said sealing member to move said sealing member from said rotatable member and when said system pressure is above said critical value said spring is compressed to allow said plunger to move away from said sealing member.

6. A hydrostatic shaft seal for a pressure system comprising a shaft; a rotatable member on said shaft; a non-rotatable sealing member mounted for axial movement relative to said rotatable member between a non-sealing position and a sealing position with respect to said rotatable member; first means biasing said non-rotatable sealing member into said sealing position; piston means exposed to a first force arising from the system pressure and to an opposed second force biasing said sealing member away from said sealing position and to a pressure lower than the system pressure, said piston means biasing said sealing member into said non-sealing position when the system pressure is below a predetermined critical value and releasing said sealing member for movement under the influence of said first means into said sealing position when said critical value of the pressure is exceeded; and a spring biasing said sealing member under said second force away from said rotatable member.

7. A hydrostatic shaft seal for a pressure system comprising a shaft a rotatable member on said shaft; a non-rotatable sealing member mounted for axial movement relative to said rotatable member between a non-sealing position and a sealing position with respect to said rotatable member; first means biasing said non-rotatable sealing member into said sealing position; piston means exposed to a first force arising from the system pressure and to an opposed second force biasing said sealing member away from said sealing position and to a pressure lower than the system pressure, said piston means biasing said sealing member into said non-sealing position when the system pressure is below a predetermined critical value and releasing said sealing member for movement under the influence of said first means into said sealing position when said critical value of the pressure is exceeded; and a spring biasing said sealing member towards said rotatable member.

8. A hydrostatic shaft seal for a pressure system comprising a shaft, a rotatable member on said shaft; a non-rotatable sealing member mounted for axial movement relative to said rotatable member between a non-sealing position and a sealing position with respect to said rotatable member; first means biasing said non-rotatable sealing member into said sealing position; piston means exposed to a first force arising from the system pressure and to an opposed second force biasing said sealing member away from said sealing position and to a pressure lower than the system pressure, said piston means biasing said sealing member into said non-sealing position when the system pressure is below a predetermined critical value and releasing said sealing member for movement under the influence of said first means into said sealing position when said critical value of the pressure is exceeded, said piston means including a plurality of plungers, a ring connected to said plungers coaxially of said sealing member and springs for biasing said plungers towards said sealing member to contact said ring with said sealing member to move said sealing member from said rotatable member when said system pressure is below said critical value.

9. A hydrostatic shaft seal for a pressure system comprising a shaft; a rotatable member on said shaft; a non-rotatable sealing member mounted for axial movement relative to said rotatable member between a non-sealing position and a sealing position with respect to said rotatable member; first means biasing said non-rotatable sealing member into said sealing position; piston means exposed to a first force arising from the system pressure and to an opposed second force biasing said sealing member away from said sealing position and to a pressure lower than the system pressure, said piston means biasing said sealing member into said non-sealing position when the system pressure is below a predetermined critical value and releasing said sealing member for movement under the influence of said first means into said sealing position when said critical value of the pressure is exceeded, said piston means including a plunger exposed to said first force on one side thereof, and a spring biasing said plunger on said opposite side against said first force, said plunger being coaxially movable into contact with said sealing member when said system pressure is below said critical value to coaxially space said sealing member from said rotatable member.

10. A hydrostatic shaft seal as set forth in claim 1 wherein said piston means is an annular piston.

11. A hydrostatic shaft seal as set forth in claim 1 wherein said lower pressure is atmospheric pressure.

* * * * *